United States Patent
Jiang (10) Patent No.: US 8,228,428 B2
(45) Date of Patent: Jul. 24, 2012

(54) VIDEO SIGNAL PROCESSING METHOD FOR OUTPUTTING VIDEO SIGNAL WITH A RESOLUTION OF P×Q AND VIDEO SIGNAL PROCESSING APPARATUS FOR RECEIVING PICTURE DATUM

(75) Inventor: Shang-Min Jiang, Hua-Lien (TW)

(73) Assignee: Generalplus Technology Inc., Hsinchu (TW)

( * ) Notice: Subject to any disclaimer, the term of this patent is extended or adjusted under 35 U.S.C. 154(b) by 560 days.

(21) Appl. No.: 12/469,963

(22) Filed: May 21, 2009

(65) Prior Publication Data

US 2010/0073556 A1    Mar. 25, 2010

(30) Foreign Application Priority Data

Sep. 25, 2008    (TW) .............................. 97136794 A (51) Int. Cl.
*H04N 11/20*    (2006.01)
*H04N 5/46*    (2006.01)
*H04N 9/74*    (2006.01)
*G09G 5/00*    (2006.01)
*G06K 9/32*    (2006.01)

(52) U.S. Cl. ........ 348/445; 348/556; 348/581; 345/660; 345/671; 382/298; 382/299; 382/300

(58) Field of Classification Search ................. 348/445, 348/581, 556; 345/660, 667–671, 530, 715, 345/716, 718; 382/298, 299, 300
See application file for complete search history.

(56) References Cited

U.S. PATENT DOCUMENTS

| | | | | |
|---|---|---|---|---|
| 5,790,714 A * | 8/1998 | McNeil et al. | ................ | 382/300 |
| 5,912,710 A * | 6/1999 | Fujimoto | ................... | 348/445 |
| 6,151,074 A * | 11/2000 | Werner | ................... | 348/425.1 |
| 6,894,706 B1 * | 5/2005 | Ward et al. | ................... | 345/660 |
| 7,408,589 B2 * | 8/2008 | Ebara et al. | ................... | 348/581 |
| 2004/0246377 A1 * | 12/2004 | Matoba et al. | ................ | 348/581 |
| 2005/0078126 A1 * | 4/2005 | Park et al. | ..................... | 345/665 |
| 2006/0072837 A1 * | 4/2006 | Ralston et al. | ................ | 382/232 |

* cited by examiner

*Primary Examiner* — Hoang-Vu A Nguyen-Ba
(74) *Attorney, Agent, or Firm* — Muncy, Geissler, Olds & Lowe, PLLC (57) ABSTRACT

The present invention relates to a video signal processing method and a video signal processing apparatus. The video signal processing apparatus receives a picture datum, which includes M×N pixel data, wherein a scan orientation of the pixel data includes M pixel data. The video signal processing apparatus includes a horizontal scaling unit and a timing control unit. The horizontal scaling unit scales the pixel data of the scan orientation of the picture datum to obtain P pixel data. The timing control unit transfers the P pixel data to a scan-line signal of the video signal, determines the number of times of outputting the scan-line signal according to a ratio of Q to N, sequentially outputs the scan-line signal according to the number of times of outputting the scan-line signal and thus outputs the video signal with a resolution of P×Q.

11 Claims, 6 Drawing Sheets

VIDEO SIGNAL PROCESSING METHOD FOR OUTPUTTING VIDEO SIGNAL WITH A RESOLUTION OF P×Q AND VIDEO SIGNAL PROCESSING APPARATUS FOR RECEIVING PICTURE DATUM

This application claims priority of No. 097136794 filed in Taiwan R.O.C. on Sep. 25, 2008 under 35 USC 119, the entire content of which is hereby incorporated by reference.

BACKGROUND OF THE INVENTION

1. Field of Invention

The present invention relates in general to the video signal processing technology, and more particularly to the video signal processing technology for adjusting the resolution.

2. Related Art

In the conventional video signal processing technology, a video signal processing apparatus usually needs to transfer the data with different resolutions to the resolution required by a rear-end display apparatus in order to satisfy the format of the output signal.

Figure 1:
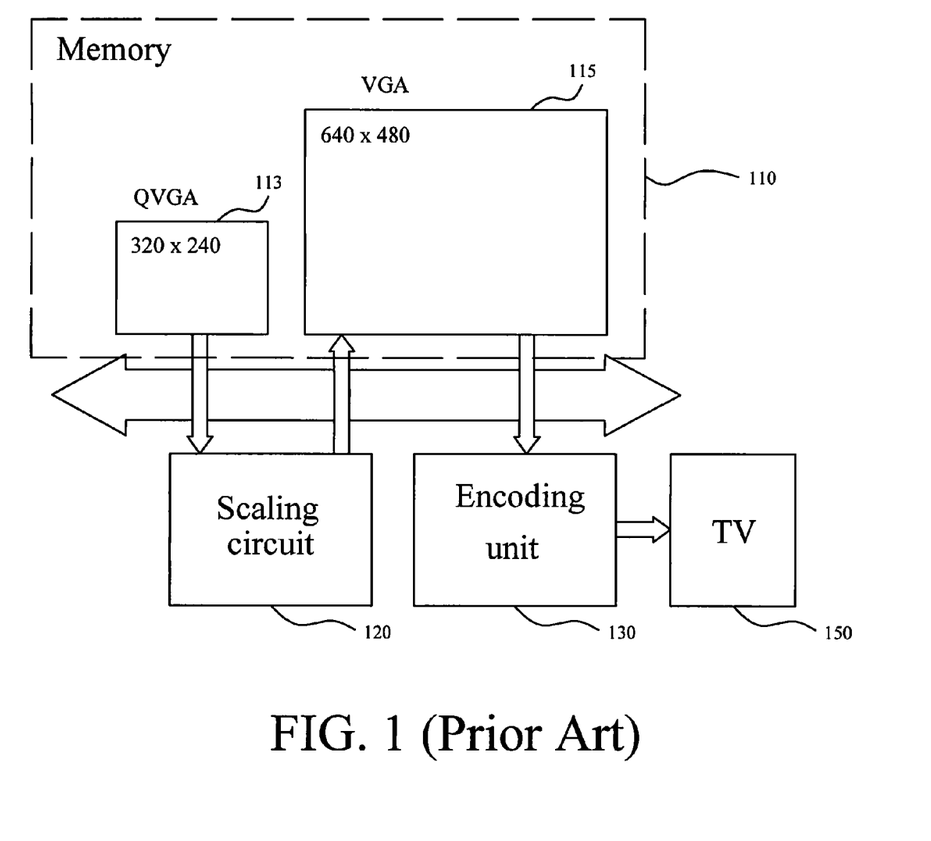
FIG. 1 is a block diagram showing a conventional video signal processing system.

FIG. 1 is a block diagram showing a conventional video signal processing system. Referring to FIG. 1, the video signal processing apparatus includes a memory 110, a scaling circuit 120 and an encoding unit 130. Under the condition when the specification of the video image received by the video signal processing apparatus corresponds to the pixel data with the resolution of 320×240 (QVGA), and the specification of the outputted video signal has the resolution of 640×480 (VGA), the memory 110 needs at least the memory spaces 113 and 115 for temporarily storing the received QVGA pixel data with the resolution of 320×240 and the VGA pixel data with the resolution of 640×480, respectively. The scaling circuit 120 firstly outputs a read request to the memory 110 once so as to read the QVGA pixel data with the resolution of 320×240 from the memory space 113 of the memory 110. Thereafter, the scaling circuit 120 scales up the QVGA pixel data into the VGA pixel data with the resolution of 640×480. Finally, the scaling circuit 120 outputs a write request to the memory 110 so that the VGA pixel data with the resolution of 640×480 is written into the memory space 115 of the memory 110.

Next, the encoding unit 130 outputs the read request to the memory 110 to read the VGA pixel data, which has the resolution of 640×480 and is stored in the memory space 115, and thus encodes the data into the signal (e.g., the composite signal) having the signal format that can be accepted by a television 150. Thereafter, the encoding unit 130 outputs the transferred analog video signal to the television 150.

In the operation of the video signal processing apparatus, the scaling circuit 120 must output the read request to the memory 110 again and again so as to read the QVGA pixel data, which has the resolution of 320×240 and is stored in the memory 110. In addition, after the scaling circuit 120 scales the QVGA pixel data, it further has to output the write request to the memory 110 so as to store the VGA pixel data with the resolution of 640×480 into the memory 110. Furthermore, the encoding unit 130 also has to read the VGA pixel data, which has the resolution of 640×480 and is stored in the memory 110, so as to perform the encoding process. Therefore, the read and write requests at each time occupy the relatively high bandwidth for the memory 110. More particularly, when the picture of the pixel data gets larger or the resolution thereof gets higher, the occupied bandwidth also becomes higher. In the embedded hardware architecture, the usage of the bandwidth of the memory 110 greatly influences the quality of the system. So, the quality of the conventional video signal processing apparatus is usually limited by the bandwidth of the memory 110. In addition, the memory 110 needs at least the memory spaces 113 and 115 for storing the QVGA pixel data and the VGA pixel data owing to this architecture. Thus, the memory 110 occupies a relatively large layout space of the integrated circuit.

Figure 2:
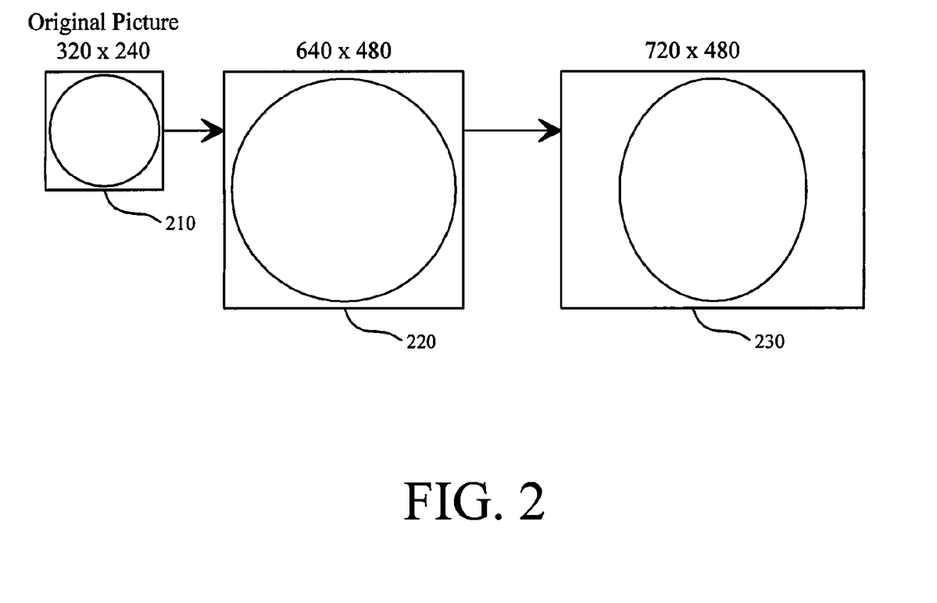
FIG. 2 shows the picture displayed by the conventional video signal processing apparatus when the resolution of the television does not have the standard ratio.

In addition, when the resolution of the video signal to be received by the television 150 has the ratio of 3:2 or 16:9, which is not the resolution with the standard ratio (e.g., the resolution is 720×480), the displayed picture has the incorrect ratio when the display apparatus directly displays the video signal coming from the video signal processing apparatus. FIG. 2 shows the picture displayed by the conventional video signal processing apparatus when the resolution of the television does not have the standard ratio. As shown in FIG. 2, the picture 210 is the original picture corresponding to the VGA pixel data with the resolution of 320×240, and the picture 220 is the picture, which is obtained after the scaling operation is performed and corresponds to the VGA pixel data with the resolution of 640×480. The picture 230 is the picture displayed on the television 150 and having the resolution of 720×480. According to the pictures 210 to 230, it is obtained that the scaled picture 220 is the same as the original picture 210 and has the perfect circular pattern. However, the picture 230 displayed in the television 150 is obviously distorted so that the displayed picture is turned into an ellipse. Therefore, the television 150 must perform a horizontal scaling process on the received video data, or the design of the scaling circuit 120 in the video signal processing apparatus has to be adjusted so that the problem of picture distortion can be solved. However, this design greatly increases the hardware cost of the system. In addition, the scaling circuit 120 needs to perform the scaling operation on the overall picture datum in the hardware architecture of the embedded system, so the hardware complexity of the overall video signal processing apparatus is also increased, and the hardware cost of the embedded system is also greatly increased.

SUMMARY OF THE INVENTION

It is therefore an objective of the present invention to provide a video signal processing method and a video signal processing apparatus for reducing a bandwidth of a memory and solving the problem of the poor ratio of the resolution of the display apparatus.

Another objective of the present invention is to provide a video signal processing method and a video signal processing apparatus for reducing the usage of the memory and reducing the layout area of the integrated circuit.

To achieve the above-identified or other objectives, the present invention provides a video signal processing method for outputting a video signal with a resolution of P×Q. The method includes the steps of: receiving a picture datum, which includes M×N pixel data, wherein a scan orientation of the picture datum includes M pixel data; scaling the M pixel data of the scan orientation of the picture datum to obtain P pixel data; transferring the P pixel data to a scan-line signal of the video signal; and determining the number of times of outputting the scan-line signal according to a ratio of Q to N, wherein, M, N, P and Q are positive integers.

The present invention additionally provides a video signal processing apparatus for receiving a picture datum, which includes M×N pixel data, and outputting a video signal with a resolution of P×Q, wherein a scan orientation of the picture datum includes M pixel data. The video signal processing apparatus includes a horizontal scaling unit and a timing control unit. The horizontal scaling unit scales the M pixel data of the scan orientation of the picture datum to obtain P pixel data. The timing control unit transfers the P pixel data to a scan-line signal of the video signal, and determines the number of times of outputting the scan-line signal according to a ratio of Q to N, wherein M, N, P and Q are positive integers.

In the video signal processing apparatus and method according to the preferred embodiment of the present invention, the timing control unit sequentially outputs the scan-line signal according to the number of times of outputting the scan-line signal. The scan-line signal is a composite signal. The M pixel data are scaled by way of interpolation. The video signal processing apparatus further includes a memory for storing the M×N pixel data of the picture datum. The resolution of the video signal is 640×480 or 720×480.

The spirit of the present invention is to scale the pixel data of each scan orientation, and directly output the scaled data to the timing control unit so that the number of times of accessing the memory can be reduced, and the usage of the bandwidth of the memory can be reduced. Thus, the system performance of the overall video signal processing cannot be influenced by the bandwidth of the memory. In addition, the present invention reduces the usage of the memory, the layout area of the integrated circuit, and thus the manufacturing cost. In addition, the horizontal scaling unit only scales the pixel data in the horizontal direction, so the present invention only needs to adjust the scaling operation in the horizontal scaling unit and can thus solve the problem of displayed picture distortion when the resolution of the display apparatus is not the standard resolution. Thus, the hardware cost of the video signal processing apparatus may also be decreased.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 3:
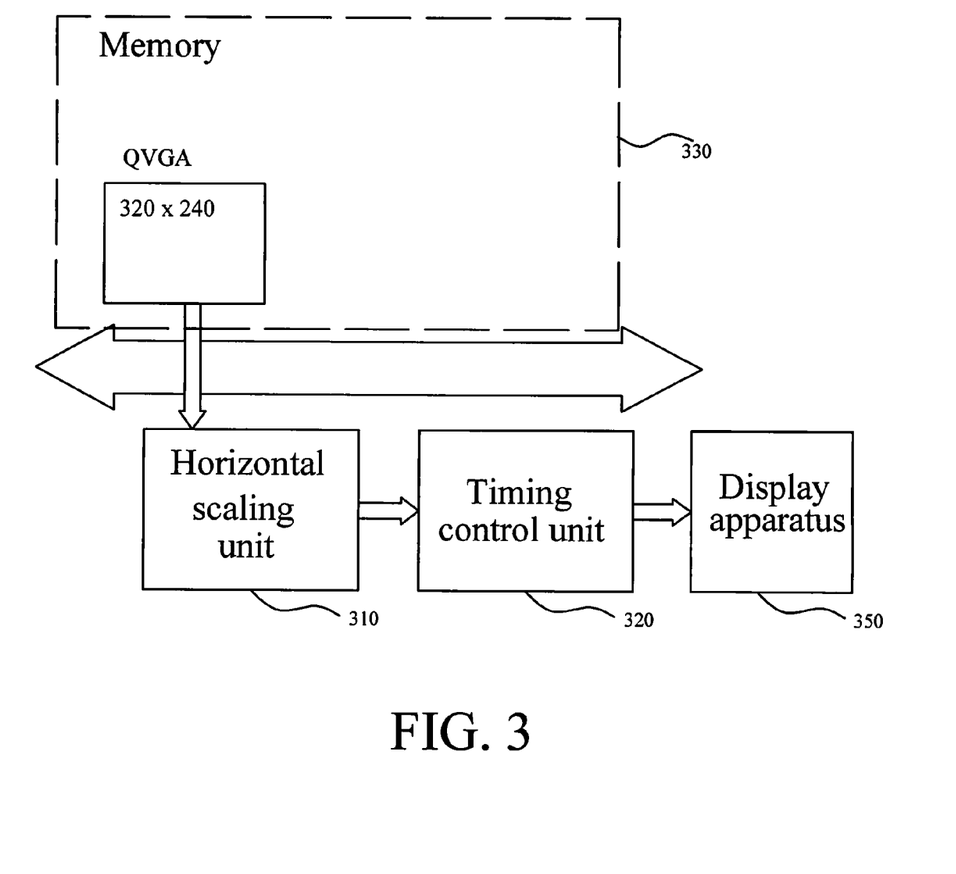
FIG. 3 is a system block diagram showing a video signal processing apparatus according to an embodiment of the present invention.

FIG. 3 is a system block diagram showing a video signal processing apparatus according to an embodiment of the present invention. Referring to FIG. 3, the video signal processing apparatus includes a horizontal scaling unit 310, a timing control unit 320 and a memory 330. The video signal processing apparatus receives a picture datum, which includes M×N pixel data. The video signal processing apparatus is coupled to a display apparatus 350, wherein the resolution of a video signal required by the display apparatus 350 is P×Q. In order to facilitate the description of this embodiment, it is assumed that M×N is 320×240, P×Q is 640×480, and the scan orientation of the picture datum is the horizontal direction including 320 pixel data.

Figure 4:
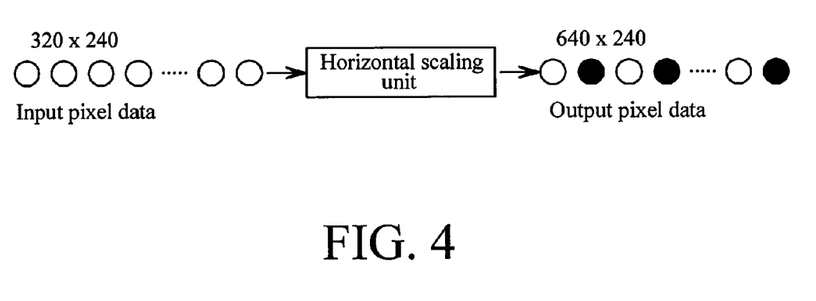
FIG. 4 is a schematic illustration showing a scaling operation according to this embodiment of the present invention.

After the video signal processing apparatus receives the picture datum, the video signal processing apparatus stores 320×240 pixel data of the picture datum into the memory 330. The horizontal scaling unit 310 reads the horizontal direction of the picture datum in the memory 330, and scales the 320 pixel data in the horizontal direction of the picture datum. Herein, a scaling operation is shown in FIG. 4, for example. FIG. 4 is a schematic illustration showing the scaling operation according to this embodiment of the present invention. Referring to FIG. 4, symbol "○" represents the originally inputted pixel data, and symbol "●" represents the inserted pixel data. As for the originally inputted 320 pixel data in a certain horizontal direction, a pixel datum is inserted between two originally inputted pixel data after the scaling operation. In addition, the value of the inserted pixel datum is obtained by averaging the values of the front and rear original pixel data. Thus, 640×240 pixel data are obtained after the 320×240 pixel data in the picture datum is scaled.

As shown in FIG. 3, the timing control unit 320 is coupled to the horizontal scaling unit 310 and receives 640 pixel data obtained after the scaling operation. Herein, if the format of the video signal required by the display apparatus 350 is different from the format of the original pixel data, the timing control unit 320 can perform a video signal encoding operation on the 640 pixel data to obtain a scan-line signal according to the format of the video signal required by the display apparatus, and determine the number of times of outputting the scan-line signal according to the ratio of the numbers of pixel data in the vertical direction. The originally inputted picture datum includes 320×240 pixel data, and the video signal to be outputted has the resolution of 640×480. Thus, the ratio of the numbers of pixel data in the vertical direction is 480/240, and the number of times the timing control unit 320 outputs the same scan-line signal is equal to 2. In other words, the scan-line signal formed by the pixel data on the horizontal direction is repeatedly outputted twice so that the resolution of the video signal received by the display apparatus 350 may satisfy the requirement of 640×480 after the 640×240 pixel data, generated after the scaling operation, is outputted by the timing control unit 320.

In the frequently used specification at present, for example, it is assumed that the format of the video signal required by the display apparatus 350 is the format of the composite signal. After the timing control unit 320 of this embodiment receives 640 pixel data coming from the horizontal scaling unit 310, the timing control unit 320 firstly transfers the 640 pixel data to the analog composite signal. Thereafter, the timing control unit 320 further repeatedly outputs the transferred composite signal to the display apparatus 350 twice to satisfy the required resolution of 640×480.

The horizontal scaling unit 310 only scales the picture datum in the horizontal direction but does not scale the overall picture datum. Thus, compared with the conventional video signal processing apparatus, the present invention greatly reduces the complexity required by the scaling operation of the video signal processing apparatus, and also decreases the hardware cost. In addition, only the horizontal scaling operation is performed on the inputted picture datum in this embodiment, wherein the operation may be implemented by way of interpolation. So, no hardware has to be used in the horizontal scaling unit 310, and the software or firmware may be utilize to implement this operation so that the design of the video signal processing apparatus may become more flexible to match with the specifications of different resolutions. In addition, the memory 330 only needs to store 320×240 pixel data in the video signal processing architecture mentioned hereinabove. Thus, the present invention can greatly decrease the capacity of the memory 330, which is needed in the video signal processing operation. In addition, the horizontal scaling unit 310 only needs to sequentially read the picture datum in the horizontal direction within the memory 330 and needs not to write the scaled data into the memory. Therefore, the present invention can reduce the number of times of reading and writing the memory 330, and thus effectively reduce the usage of the memory bandwidth.

Figure 5:
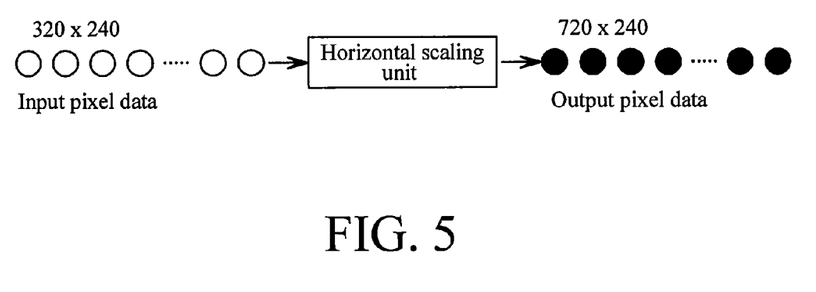
FIG. 5 is a schematic illustration showing the scaling operation according to this embodiment of the present invention.

In addition, if the video signal required by the display apparatus 350 has the resolution of 720×480, the horizontal scaling unit 310 scales the 320 pixel data in the horizontal direction to generate 720 pixel data in the horizontal direction. Herein, the scaling operation is illustrated in FIG. 5, for example. FIG. 5 is a schematic illustration showing the scaling operation according to this embodiment of the present invention. As shown in FIG. 5, symbol "○" represents the originally inputted pixel data, and symbol "●" represents the pixel data obtained after calculation, wherein the horizontal scaling unit generates 720 pixel data after interpolating the 320 pixel data. Thus, the 320×240 pixel data in the picture datum are scaled so that 720×240 pixel data are obtained. Similarly, the timing control unit 320 transfers the 720 pixel data, in the horizontal direction, to the scan-line signal, and then repeatedly outputs the scan-line signal twice. Therefore, the video signal received by the display apparatus 350 has the resolution of 720×480.

Figure 6:
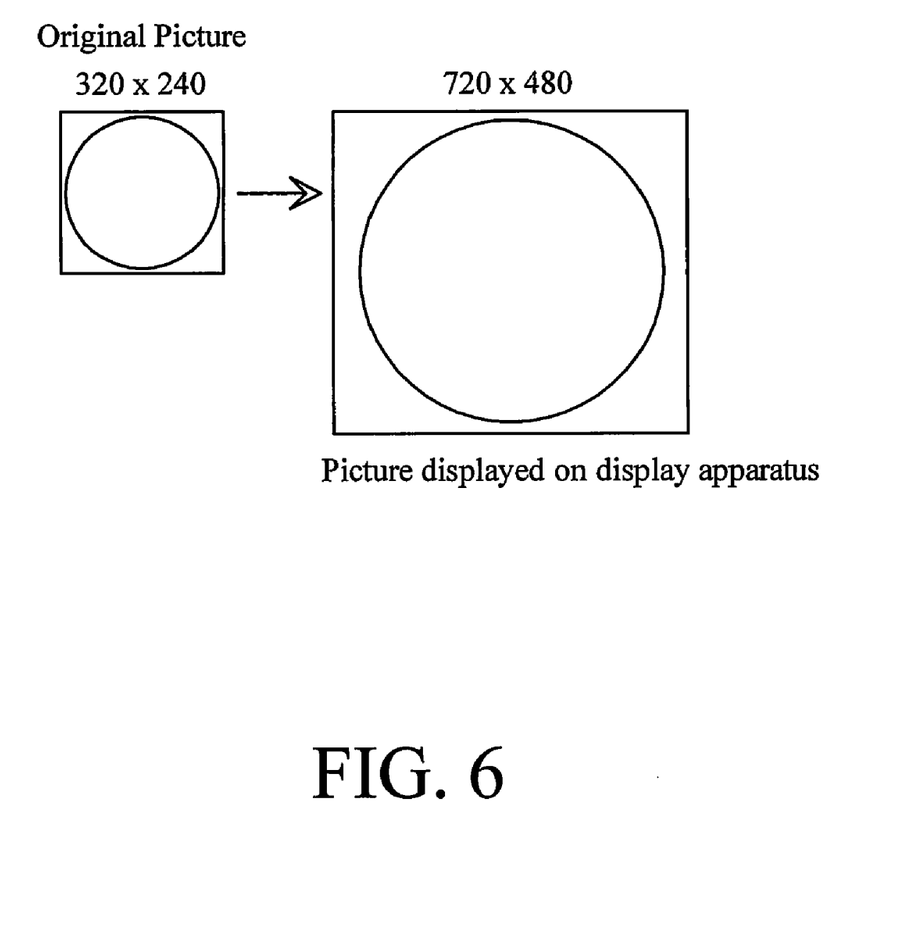
FIG. 6 shows the picture displayed by the video signal processing apparatus according to this embodiment of the present invention.

According to the above-mentioned implementation, it is obtained that the horizontal scaling unit 310 directly scales the picture datum in the horizontal direction, and then the timing control unit 320 sequentially outputs the video signal in the horizontal direction to the display apparatus 350. Therefore, when the display apparatus 350 directly displays the received scan-line signal, the displayed picture cannot encounter the problem of picture distortion, as shown in FIG. 6. FIG. 6 shows the picture displayed by the video signal processing apparatus according to this embodiment of the present invention. As shown in FIG. 6, the original picture datum corresponds to a true circular picture, and the display apparatus 350 can display the originally true circular picture. In other words, the present invention still can make the display apparatus truly display the original picture without adding the redundant hardware cost when the resolution required by the display apparatus has the nonstandard ratio, such as 3:2 or 16:9.

Figure 7:
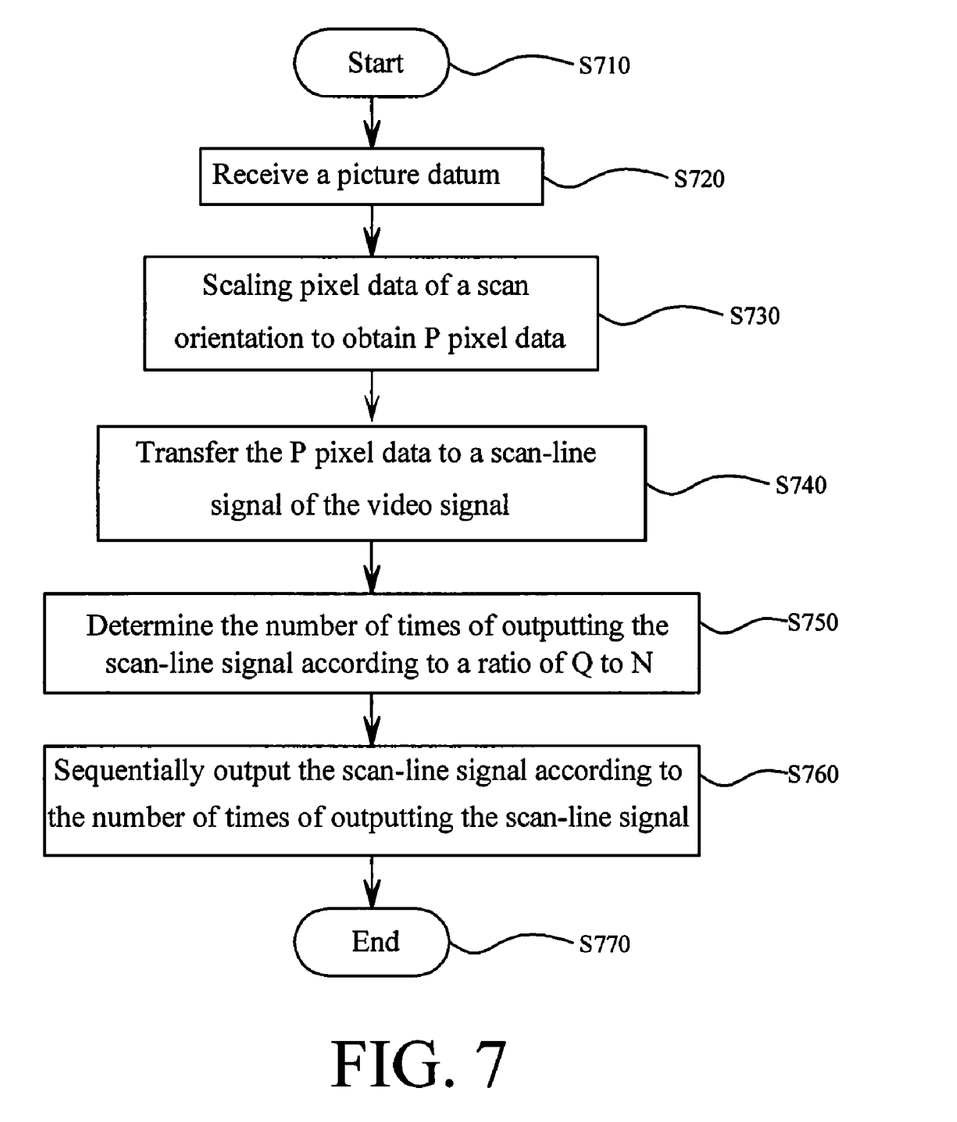
FIG. 7 is a flow chart showing steps in a video signal processing method according to the embodiment of the present invention.

According to the above-mentioned implementation, the present invention can be concluded to provide a video signal processing method. FIG. 7 is a flow chart showing steps in the video signal processing method according to the embodiment of the present invention. Referring to FIG. 7, the method includes the following steps.

In step S710, the video signal processing method according to the embodiment of the present invention is started.

In step S720, a picture datum is received, wherein the picture datum includes M×N pixel data, and a scan orientation of the picture datum includes M pixel data.

In step S730, the pixel data in the scan orientation of the picture datum is scaled to obtain P pixel data.

In step S740, a video signal transferring process is performed on the P pixel data to obtain a scan-line signal in the video signal. That is, the P pixel data are transferred to the scan-line signal in the video signal.

In step S750, the number of times of outputting the scan-line signal is determined according to the ratio of Q to N.

In step S760, the scan-line signal is sequentially outputted according to the determined number of times of outputting the scan-line signal.

In step S770, the video signal processing method is ended.

Although the composite signal is illustrated as an example in the above-mentioned embodiment, one of ordinary skill in the art may derive that the video signal processing method of the present invention may be utilized to obtain the good result when the outputted signal is the YC, YUV or YCbCr signal according to the embodiments of the present invention.

In summary, the spirit of the present invention is to scale the pixel data of each scan orientation, and directly output the scaled data to the timing control unit. Consequently, the present invention includes at least the following advantages.

First, the number of times of accessing the memory can be reduced, and the usage of the bandwidth of the memory bandwidth can be reduced so that the system performance of the overall video signal processing cannot be influenced by the restriction of the bandwidth of the memory.

Second, the usage of the memory is reduced, the layout area of the integrated circuit is reduced, and the manufacturing cost can be reduced.

Third, because the horizontal scaling unit 310 only scales the picture datum in the horizontal direction, the present invention greatly reduces the complexity for the scaling operation and thus decreases the hardware cost.

Fourth, because the horizontal scaling unit only scales the pixel data of the scan orientation, the present invention only needs to adjust the scaling operation in the horizontal scaling unit, and can solve the problem of displayed picture distortion and thus decrease the hardware cost of the video signal processing apparatus when the resolution of the display apparatus is not the standard resolution.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A video signal processing method for outputting a video signal with a resolution of P×Q, the method comprising the steps of:

receiving a picture datum, which comprises M×N pixel data, wherein a scan orientation of the picture datum comprises M pixel data;

scaling the M pixel data of the scan orientation of the picture datum to obtain P pixel data;

transferring the P pixel data to a scan-line signal of the video signal; and determining the number of times of outputting the scan-line signal according to a ratio of Q to N, wherein, M, N, P and Q are positive integers.

2. The method according to claim 1, further comprising the step of:

sequentially outputting the scan-line signal according to the number of times of outputting the scan-line signal.

3. The method according to claim 1, wherein the scan-line signal is a composite signal.

4. The method according to claim 1, wherein the M pixel data are scaled by way of interpolation.

5. The method according to claim 1, wherein the resolution of the video signal is 640×480 or 720×480.

6. A video signal processing apparatus for receiving a picture datum, which comprises M×N pixel data, and outputting a video signal with a resolution of P×Q, wherein a scan orientation of the picture datum comprises M pixel data, the apparatus comprising:

a horizontal scaling unit for scaling the M pixel data of the scan orientation of the picture datum to obtain P pixel data; and a timing control unit for transferring the P pixel data to a scan-line signal of the video signal, and determining the number of times of outputting the scan-line signal according to a ratio of Q to N, wherein M, N, P and Q are positive integers.

7. The apparatus according to claim 6, wherein the timing control unit sequentially outputs the scan-line signal according to the number of times of outputting the scan-line signal.

8. The apparatus according to claim 6, wherein the scan-line signal is a composite signal.

9. The apparatus according to claim 6, wherein the M pixel data are scaled by way of interpolation.

10. The apparatus according to claim 6, further comprising:

a memory for storing the M×N pixel data of the picture datum.

11. The apparatus according to claim 6, wherein the resolution of the video signal is 640×480 or 720×480.

* * * * *